United States Patent
Ganesh et al.

(10) Patent No.: US 9,165,016 B2
(45) Date of Patent: Oct. 20, 2015

(54) TECHNIQUES FOR AUTOMATIC DATA PLACEMENT WITH COMPRESSION AND COLUMNAR STORAGE

(71) Applicant: Oracle International Corporation, Redwood Shores, CA (US)

(72) Inventors: Amit Ganesh, San Jose, CA (US); Vineet Marwah, San Ramon, CA (US); Vikram Kapoor, Cupertino, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/570,199

(22) Filed: Dec. 15, 2014

(65) Prior Publication Data
US 2015/0149419 A1    May 28, 2015

Related U.S. Application Data (63) Continuation of application No. 13/475,669, filed on May 18, 2012, now Pat. No. 8,959,057.

(60) Provisional application No. 61/488,125, filed on May 19, 2011.

(51) Int. Cl.
G06F 17/30    (2006.01)
G06F 3/06    (2006.01)

(52) U.S. Cl.
CPC .......... *G06F 17/30221* (2013.01); *G06F 3/064* (2013.01); *G06F 3/0608* (2013.01); *G06F 3/0653* (2013.01); *G06F 3/0673* (2013.01); *G06F 17/3048* (2013.01); *G06F 17/30315* (2013.01); *G06F 17/30371* (2013.01)

(58) Field of Classification Search
CPC ................... G06F 17/30073; G06F 17/30221
USPC .................................................. 707/661, 665
See application file for complete search history.

(56) References Cited

U.S. PATENT DOCUMENTS

| | | | |
|---|---|---|---|
| 5,794,229 A | 8/1998 | French et al. | |
| 8,959,057 B2 | 2/2015 | Ganesh et al. | |
| 2009/0024678 A1 | 1/2009 | Milby | |
| 2009/0187586 A1 | 7/2009 | Olson | |
| 2010/0306493 A1* | 12/2010 | Carrillo et al. | ................ 711/167 |
| 2012/0296883 A1 | 11/2012 | Ganesh et al. | |

OTHER PUBLICATIONS

Qilong Han et al., "A Concurrency Control Algorithm Access to Temporal Data in Real-Time Database Systems", Computer and Computational Sciences, dated 2008., IEEE, Piscataway, NJ, USA, Oct. 18, 2008, 4 pages.

* cited by examiner

*Primary Examiner* — Thu-Nguyet Le
(74) *Attorney, Agent, or Firm* — Hickman Palermo Becker Bingham LLP; Marcel K. Bingham (57) ABSTRACT

For automatic data placement of database data, a plurality of access-tracking data is maintained. The plurality of access-tracking data respectively corresponds to a plurality of data rows that are managed by a database server. While the database server is executing normally, it is automatically determined whether a data row, which is stored in first one or more data blocks, has been recently accessed based on the access-tracking data that corresponds to that data row. After determining that the data row has been recently accessed, the data row is automatically moved from the first one or more data blocks to one or more hot data blocks that are designated for storing those data rows, from the plurality of data rows, that have been recently accessed.

20 Claims, 4 Drawing Sheets

TECHNIQUES FOR AUTOMATIC DATA PLACEMENT WITH COMPRESSION AND COLUMNAR STORAGE

CROSS-REFERENCE TO RELATED APPLICATIONS

The present application is a continuation of U.S. patent application Ser. No. 13/475,669, filed by Amit Ganesh, et al. on May 18, 2012, which is incorporated herein by reference, and which claims priority to U.S. Provisional Application Ser. No. 61/488,125, filed on May 19, 2011 by Amit Ganesh et al. and entitled "TECHNIQUES FOR AUTOMATIC DATA PLACEMENT WITH COMPRESSION AND COLUMNAR STORAGE", the entire contents of which is hereby incorporated by reference as if fully set forth herein.

This application is related to U.S. application Ser. No. 12/871,824, filed on Aug. 30, 2010 by Vineet Marwah et al. and entitled "QUERY AND EXADATA SUPPORT FOR HYBRID COLUMNAR COMPRESSED DATA", the entire contents of which is hereby incorporated by reference as if fully set forth herein.

TECHNICAL FIELD

The present invention relates to data management in a database system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The data in relational and object-relational databases is logically organized in database objects (sometimes also referred to as "schema objects") that may include, but are not limited to, tables, views, sequences, stored procedures, indexes, clusters, and database links to other databases. Physically, the data of such databases is stored on persistent storage devices in data units (sometimes referred to as "data blocks") that are configured to store a specific number of data bytes; in various embodiments and implementations, such data units may be physically stored as raw blocks directly on the persistent storage devices or may be stored in files that are stored on the persistent stored devices. For example, the data of a relational table may be logically organized in records, where each record includes one or more fields for storing data values from the corresponding one or more columns that are configured for the table. Physically, the data values in each data record may be stored as a data row in one or more data blocks that are stored in a file on a persistent storage device such as a hard disk.

Typically, users and applications access the data of relational and object-relational databases by using queries and requests that reference the database objects that store the requested data. For example, a user or an application may send a query to a database server, where the query specifies one or more operations and one or more relational tables that store the data on which the operations are to be performed. In response to the query, the database server determines the data block(s) in which the data rows having the requested data are physically stored, copies these data blocks(s) from the persistent storage devices into a buffer cache in volatile memory if these data block(s) are not already in the buffer cache, and performs the operations specified in the query on the data rows in the copies of the data block(s) that are stored in the buffer cache. The database server may use various memory management mechanisms to flush any modified (also referred to as "dirty") data blocks from the buffer cache to the persistent storage devices in order to free up space for other data blocks that need to be read into the buffer cache.

Most persistent storage devices (e.g., such as optical or electromagnetic disks) that are used to store database data typically operate by using block-level operations that read and write data in blocks that are larger in size than a single byte or even several bytes. For example, a typical hard disk reads and writes data in disk blocks of 8K bytes; some types of hard disks may use other block sizes such as 16K and 64K. In order to take advantage of the block-level operations of such hard disks, a database server typically provides for data blocks of a size that is the same as, or a multiple of, the size of the disk blocks that are used by the hard disks. Further, in order to provide for faster data reads from and data writes to the hard disks, a database server copies each data block as an entire unit between the hard disks and the buffer cache in volatile memory. Unfortunately, database servers that use this approach for configuring and managing data blocks may encounter several problems.

One such problem is buffer cache underutilization and inefficient memory use by the database server. This is caused by the fact that most of the data processing by a database server is done at the data block level, while the actual access to the data in the buffer cache is done at the level of a data row and is therefore not block-based. For example, a database server copies entire data blocks into the buffer cache in volatile memory, writes back entire data blocks to the persistent storage devices, and compresses entire data blocks if the database server is capable of performing on-the-fly data compression. In contrast, most of the query and application access is row-based—that is, queries and applications read individual data rows, update individual data rows, delete individual rows, etc. Thus, even if only one of the data rows in a given data block is frequently accessed while the rest of the data rows are infrequently or almost never accessed, the database server would have to keep that data block in the buffer cache in order to provide efficient access to the frequently accessed data row even though this is not necessary for the rest of the data rows in that data block. This causes the buffer cache to be underutilized and essentially leads to inefficient use of volatile memory by the database server. The above problem is further exacerbated in operational contexts in which a database server may be configured to use storage mechanisms that deliberately spread a single data row across several data blocks in order to improve writing speed because this greatly increases the chances that frequently accessed data rows will be intermixed in the same data block with data rows that are not frequently accessed.

Another problem is that the above approach for configuring and managing data blocks is not easily susceptible to efficient storage optimizations. This is caused by the fact that currently, database servers allocate data rows to data blocks automatically without providing the users with any configurable row-level storage options. For example, currently some database servers allow users to specify storage and compression options for entire tables only, but do not allow users to specify such options at the granularity of a data row or even at the granularity of a data block. This prevents such database servers from being optimized for efficient storage and/or compression of data blocks, even when an application or a user (e.g., a database administrator) may have sufficient knowledge to determine that specific, individual data rows in a given table are not likely to be accessed in the near future.

BRIEF DESCRIPTION OF THE DRAWINGS

The techniques described herein are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the described techniques for automatic data placement. It will be apparent, however, that the techniques described herein may be practiced without these specific details. In other instances, well-known structures and devices are shown in block diagram form in order to avoid unnecessarily obscuring the techniques described herein.

General Overview

Techniques for automatic data placement of database data are described herein. Based on factors that indicate whether the database data is recently or frequently accessed at the level of data rows, a database server or an associated component is configured to automatically move and store individual data rows in designated data blocks. In example embodiments, the techniques described herein provide for automatically selecting which data rows should be moved based on access-tracking data that indicates how recently each individual data row was accessed, automatically determining to which data blocks the selected data rows should be moved based on (possibly configurable) rules and/or policies, and automatically moving the selected data rows to the determined data blocks in the background while the database server is executing normally and without adversely impacting the on-going operations and transactions that are being executed by the database server. In this manner, the techniques described herein provide for better buffer cache utilization and more efficient memory use because the data blocks copied into the buffer cache are more likely to store a higher percentage of data rows that have been recently and/or more frequently accessed.

According to the techniques described herein, data rows that have been recently and/or frequently accessed are separated from, and stored in different data blocks than, data blocks that have not been recently accessed. For example, the techniques described herein provide for automatically determining which data rows have been recently accessed and automatically moving these data rows to hot data blocks that are designated for storing recently and/or frequently accessed data rows. Similarly, the techniques described herein provide for automatically determining which data rows have not been recently accessed and automatically moving these data rows to cold data blocks that are designated for storing data rows that have not been recently accessed; in embodiments in which database servers provide for data compression, cold data blocks may further be compressed by using various compression mechanisms depending on the frequencies of access to the data rows stored in these data blocks. In this manner, the techniques described herein allow for configuring policies and rules that provide efficient storage options both for hot data rows that are frequently accessed and for cold data rows that are not frequently accessed.

In some embodiments, the techniques described herein provide for automatic data placement of data rows on different types of storage that have different cost and/or performance characteristics. For example, based on the access patterns of the individual data rows, some data rows that are accessed very frequently may be automatically placed in hot data blocks that are stored on very fast persistent storage devices, while other data rows that are not accessed very frequently may be automatically placed in cold data blocks that are stored on slower and/or cheaper persistent storage devices. In this manner, the techniques described herein leverage the tradeoffs between storage performance and storage capacity at the more granular level of a data row. This allows for a data placement continuum where the least accessed data rows can be moved to designated cold data blocks that may further be compressed by various compression mechanisms on high capacity/slower storage devices, whereas the more frequently accessed data rows can be moved to designated hot data blocks that are stored on faster storage devices.

In various embodiments, the techniques described herein may be implemented as one or more methods that are performed by one or more computing devices, as a computer program product in the form of sequences of executable instructions that are stored on one or more computer-readable storage media, and/or as one or more computer systems that are configured to perform the techniques described herein.

Functional Description of an Example Embodiment

Figure 1:
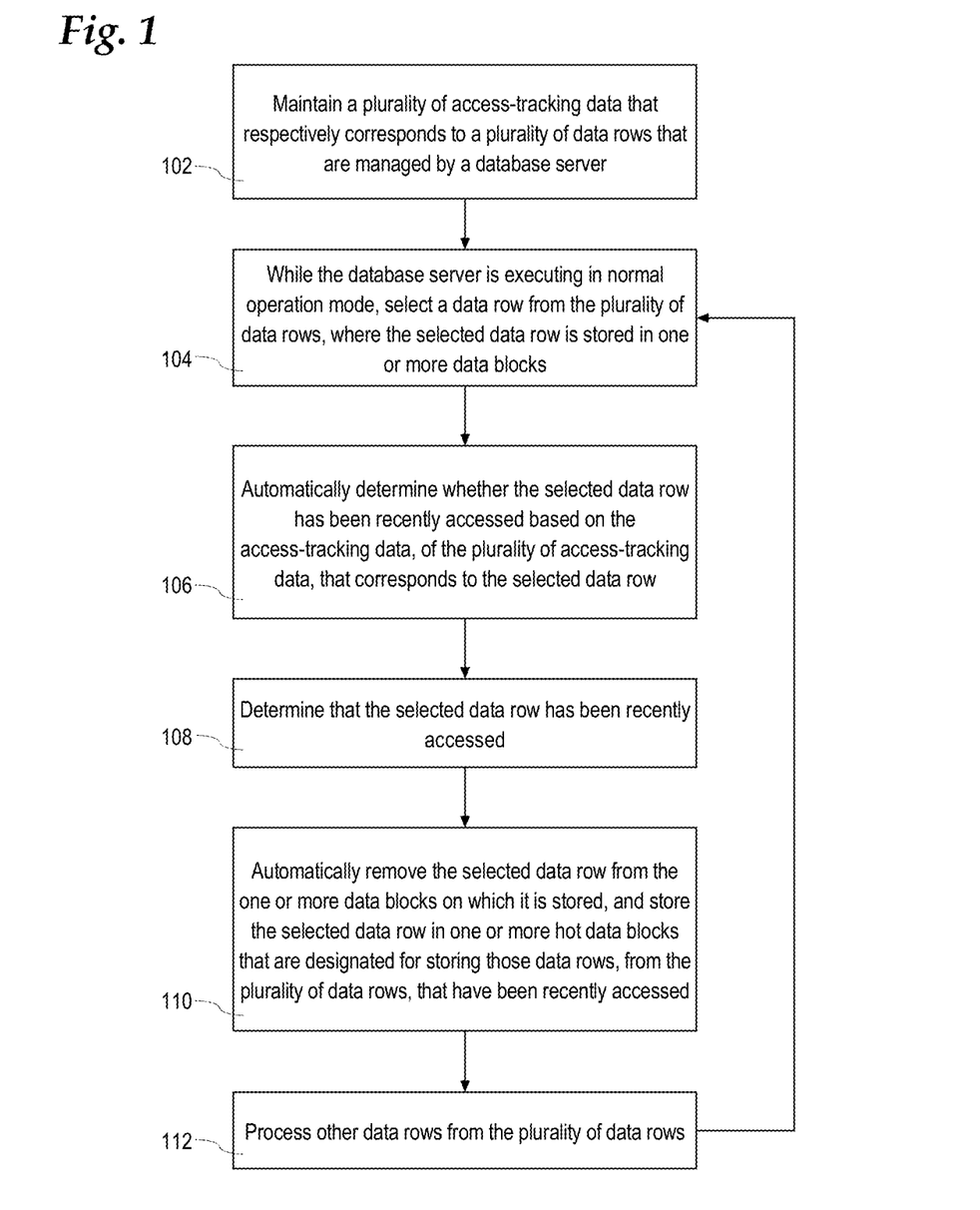
FIG. 1 is a flow diagram that illustrates an example method for automatic data placement according to one embodiment.

FIG. 1 is a flow diagram that illustrates an example method for automatic data placement in accordance with the techniques described herein.

In some embodiments, the steps of the method illustrated in FIG. 1 are performed by a database server that is executing on one or more computing devices. As used herein, "server" refers to one or more software components which, when executed, may be allocated computational resources, such as memory, CPU time, and/or disk storage space in order to perform one or more functionalities. "Database server" refers to a server that is operable to perform various functionalities against one or more databases that may include, without limitation, relational databases, object databases, object-relational databases, various kinds of XML data repositories, and any combinations thereof. For example, by utilizing its allocated resources, a database server may be configured to perform various data management functions (including, but not limited to, controlling and facilitating access to particular databases, processing requests by clients to access particular databases, and processing client-initiated operations and transactions that involve adding, deleting, and/or modifying data in particular databases), as well as database management functions (including, but not limited to, creating databases and tables, allocating disk space for databases and tables, managing memory buffers and other volatile memory allocated to databases and database-related processes, and/or creating and maintaining user login information, role information, and security policy information). In clustered operational environments, a database server may be a server instance that operates as part of a database server cluster that is operable to perform data management functions and database management functions against one or more databases. In some embodiments, the steps of the method illustrated in FIG. 1 may be performed by computer process entities other than a database server including, but not limited to, background processes or threads, daemon processes, and any other types of system services or servers that can run automatically and not under direct user control.

The method illustrated in FIG. 1 is described hereinafter as being performed by a database server or one or more associated components thereof. However, it is noted that this description is for illustrative purposes only because the method of FIG. 1 is not limited to being performed by any particular type of computer process entity or service.

In step 102, a database server and/or a component thereof stores and continuously maintains a plurality of access-tracking data that respectively corresponds to a plurality of data rows that are managed by the database server. As used herein, "data row" refers to a storage structure that is configured for storing one or more values that correspond to one or more columns of a database object such as, for example, a table, an index, or a materialized view. For example, in a database table that stores employee data in three columns named "ID", "first_name", and "last_name", a particular data row can store values for an employee ID, a first name, and a last name for a particular employee. (It is noted that in addition to storing the values for the database object columns, in some implementations a data row may include values for one or more additional hidden, system, and/or pseudo columns that are automatically added to the underlying database object and maintained by the database server.) As used herein, "access-tracking data" refers to a set of one or more values that are associated with a particular data row and that indicate the recent time(s) that the particular data row was accessed.

While the database server is executing in normal operation mode, in step 104 the database server or a component thereof automatically selects, for processing in accordance with the techniques described herein, a particular data row that is stored in one or more data blocks. (It is noted that as used herein, "automatic" and "automatically" means that the referenced functionality is performed by a computing device without receiving, and not in response to, input from a user.)

"Data block" refers to an atomic unit (e.g., such as a data structure) of storage space that is allocated to store bytes of data from one or more data rows and/or portions thereof. Typically, a database server is configured to read and write groups of data rows from persistent storage and volatile memory in units no smaller than data blocks. When a data row from a data block needs to be retrieved, the entire data block is read into an in-memory buffer cache that the database server uses to temporarily store data blocks. In some embodiments, the data blocks for a given database may be all of a common, fixed size that is configured when the database is created. In other embodiments, the data blocks for a given database may have variable sizes. Depending on the number and data types of the data values that are stored in data rows, a particular data block may store the data values from single data row or may store the data values from multiple data rows, where the multiple data rows may logically belong to the same database object or to multiple different database objects. In various database server embodiments and implementations, the data blocks which store the data of a given database may be logically organized in various storage space structures (e.g., such as extents, segments, tablespaces, etc.) and may be physically allocated as raw hard disk blocks or as portions of Operating System (OS) data files.

With respect to step 104 in FIG. 1, the techniques for automatic data placement described herein are not limited to any particular mechanism of selecting which data rows would be automatically processed. For example, in some embodiments a database server or a component thereof may be configured to monitor and automatically process the data rows in all data blocks that are copied from the persistent storage devices into the buffer cache in volatile memory. In other embodiments, a database server or a component thereof may be configured based on rules or policies to monitor and automatically process the data rows in some, but not all, of the data blocks that are copied into the buffer cache—for example, the database server may be configured to process the data rows of only those data blocks that are not pinned in the buffer cache or of those data blocks that store data for a set of specified database objects.

After selecting a data row for automatic data placement, in step 106 the database server or a component thereof automatically determines whether the selected data row has been recently accessed based on the access-tracking data that corresponds to that data row. For example, the database server or the component thereof may access one or more time values in the access-tracking data for the selected data row, may compare the one or more time values to some static or dynamically-configurable threshold parameter(s), and based on the comparison may determine whether the selected data row has been recently accessed. In step 108, the database server or the component thereof determines that the selected data row has been recently accessed.

In step 110, the database server or the component thereof automatically removes the selected data row from the one or more data blocks in which the selected data row is currently stored, and automatically stores the selected data row in one or more hot data blocks. As used herein, a "hot" data block refers to a data block that is designated for storing data rows that have been recently accessed. In step 112, the database server or a component thereof proceeds to select and process other data rows by performing steps 104 to 110, while concurrently and continuously maintaining the access-tracking data for the plurality of data rows as indicated in step 102.

According to the techniques described herein, the move operation, which moves a data row from its current data block(s) to its new location in different data block(s), is implemented in a manner that does not adversely impact the normal operation of the database server and any on-going operations and transactions that may be executing therein. For example, in some embodiments the database server or a component thereof may automatically decide when to perform such move operation for one or more selected data rows based on various performance parameters of the database server such as, for example, current CPU utilization, number of on-going transactions, number of current database connections, etc.

In some embodiments, in step 106 the database server or a component thereof may be further configured to automatically determine whether a selected data row has not been recently accessed. For example, based on one or more time values in the access-tracking data for the selected data row, the database server or the component thereof may determine that the selected data row has not been recently accessed. Thereafter, the database server or the component thereof automatically removes the selected data row from the one or more data blocks in which the selected data row is currently stored, and automatically stores the selected data row in one or more cold data blocks. As used herein, a "cold" data block refers to a data block that is designated for storing data rows that have not been recently accessed. Thus, in these embodiments, the techniques described herein allow the database server to store recently accessed rows in hot data blocks and to store data rows that have not been recently accessed in cold data blocks, thereby minimizing the number of data blocks in which hot and cold data rows are intermixed.

Row-Specific Access-Tracking Data

According to the techniques described herein, row-specific access-tracking data is used to determine whether individual data rows have been recently accessed. In some embodiments, the access-tracking data for an individual data row is a set of one or more values that indicate the most recent one or more times that the particular data row and/or the database object to which the particular data row belongs were accessed. As used herein, "access" and "accessed" refer to operations that include read operations, modify operations, and create operations. For example, the most recent time a particular data row was accessed may refer to a time at which one or more of the following operations were performed: a create operation which generated the particular data row; a read operation that read at least one value from the particular data row; and/or a modify operation that modified at least one value or some other parameter in the particular data row.

According to the techniques described herein, a database server may be configured to maintain various types of access-tracking data in various storage locations. For example, in some embodiments the access-tracking data for a data row may include a flag which is automatically maintained by the database server and which, when set, indicates that the data row was "touched" or accessed within a pre-determined period of time. In some embodiments, the access-tracking data for a data row may include one or more time values which indicate the most recent one or more times that the data row was accessed. In some embodiments, the access-tracking data for a data row may include one or more timestamps or other values from which the database server can derive the most recent one or more times that the data row was accessed. Thus, the techniques described herein are not limited to any particular type of values that may be used as access-tracking data to determine whether an individual data row was recently accessed.

In some embodiments, the access-tracking data for each particular data row may be stored within that particular data row. For example, in some implementations a database server may automatically add a pseudo-column to all data rows that store the data for a given database object (e.g., such as a table), and thereafter may use the pseudo-column in each particular data row to continuously update the access-tracking data for that particular data row. In some other implementations, instead of adding a pseudo-column to the data rows, the database server may use a system and/or a hidden column that already exists in the data rows and is used by the database server for some other maintenance purposes. For example, in these implementations the database server may use as access-tracking data a system change number that is stored in a system column of a particular data row and that identifies the transaction that last modified the particular data row, where the database server may use a system function to convert the system change number into a time value or a timestamp value. In yet other implementations that use row headers, a database server may store and continuously update the access-tracking data for a particular data row within the row header of that particular data row.

In some embodiments, the access-tracking data for each particular data row may be stored within the block header(s) of the data block(s) in which that particular data row or a portion thereof is stored. The header of a given data block stores metadata information (e.g. such as row IDs, row offsets within the block, etc.) about the data rows (or portions thereof) that are stored in that data block, where the database server or a component thereof may use this metadata information to manage and access the data rows within that data block. For example, the database server can store and continuously update, within the header of a particular data block, a separate access-tracking data for each separate data row (or a portion thereof) that is stored in that particular data block. In some other embodiments, the database server can store and continuously update, in a system-wide repository, the access-tracking data that corresponds to all, or to some identified subset of, data rows that store the data of one or more databases that are managed by the database server. In yet some other embodiments, the access-tracking data for each particular data row may be supplied to the database server by the client or the application that accesses a particular set of data rows (e.g., the data rows that store the data for a particular table), where the database server can maintain and use the supplied access-tracking data to evaluate one or more policies or rules that determine whether a given data row should be classified as hot (e.g., as being recently accessed) or as cold (e.g., as not being recently accessed).

The techniques for automatic data placement described herein are based on access patterns for each individual data row. In accordance with these techniques, a database server or a component associated therewith is configured to classify the individual data rows as hot or as cold and to move the individual data rows to hot or cold data blocks accordingly. This classification decision is an on-going process that is performed while the database server is executing in normal operation mode and without adversely impacting any on-going operations and transactions that the database server may be executing. While some embodiments may provide static or dynamically configurable parameters or policies based on which data row classification can be made, the database server automatically makes all the decisions of which data rows are classified as hot and cold, to which data blocks the classified data rows should be moved, how the classified data rows should be moved, and when the classified data rows should be moved.

According to the techniques described herein, the values in the access-tracking data for a given data row that may be used to classify the data row as hot or as cold may include, without limitation, one or more of the following:

last read time for the data row, which indicates the time when the data row was last read;

last modification time for the data row, which indicates the time when the data row was last updated or otherwise modified, and which in some embodiments may be initially set to the time the data row was originally created and allocated to a data block in the buffer cache;

last access time(s) for the table, segment, and/or partition which stores the data row, which indicate(s) the last time the table, segment, and/or partition (but not necessarily the data row) was accessed;

last modification time(s) for the table, segment, and/or partition which stores the data row, which indicate(s) the last time the table, segment, and/or partition (but not necessarily the data row) was modified;

one or more parameter values that are specified by the application or the client that accesses the data row, where the one or more parameter values may be associated with the parameters of a policy that is configured at the database server, and where the application or the client may include sophisticated logic that can set the one or more parameter values in a manner that affects whether the data row is classified as hot or as cold when the database server evaluates the policy for the data row.

According to the techniques described herein, the values maintained as the access-tracking data for a given data row can be used by the database server individually and/or in combination to determine whether that data row is classified as hot or as cold. For example, if database server determines that the data row is last accessed within a certain threshold period of time (e.g., such as the previous 5 seconds, 1 minute, 3 minutes, etc.), then the database server will classify the data row as hot; otherwise, the database server will classify the data row as cold. In another example, if database server determines that the data row is last accessed within some threshold period of time or if the partition that stores the data row has been accessed within some threshold period of time, then the database server will classify the data row as hot; otherwise, the database server will classify the data row as cold. In this example, when table-level, segment-level, and/or partition-level parameters are used to classify data rows as hot or as cold, such parameters may be associated with different thresholds that may be maintained by the database server in one or more policies.

Example Automatic Data Placement Operations

The techniques for automatic data placement described herein provide for automatically re-allocating data rows from the current data blocks, in which the data rows are stored, to different data blocks based on how recently and/or frequently the data rows have been accessed. The operations included in such automatic data placement involve re-allocating data rows in the background while the database server, which manages the database to which the data rows belong, is executing in normal operation mode.

As used herein, "normal operation mode" refers to an execution mode in which a database server performs normal processing of database transactions and operations that include, but are not limited to, on-line transaction processing (OLTP) operations, on-line analytical processing (OLAP) operations, and any other operations that may be initiated by the database server itself, through user interfaces, or by clients and applications that access data managed by the database server. According to the techniques described herein, any such transactions and operations that are being executed by the database server in normal operation mode are not adversely impacted or affected by the automatic data placement operations that re-allocate data rows in hot or cold data blocks. For example, when data rows are being moved around to different data blocks, queries and requests processed by the database server (e.g., such as select, insert, update, delete queries and any calls and requests from various database server processes or threads such as checkpoint processes and various log writers) are not deliberately slowed down, locked, or otherwise adversely impacted. In some embodiments, according to the techniques described herein, automatic data placement operations that re-allocate data rows in hot or cold data blocks are not executed as part of, or in response to, any transactions and operations that are being executed by the database server in response to queries and requests from users, clients, and applications that access the data managed by the database server.

In order to minimize or outright avoid any adverse impact on the normal processing performed by the database server, the techniques described herein provide for automatically making decisions in the background about which data rows to select for moving, to which data blocks the selected data rows should be moved, how the data rows should be moved, and when the data rows should be moved. These automatic decisions (which, where, how, and when) are determined for each data row that is moved to a different data block.

According to the techniques described herein, these automatic decisions are made by the database server or a component thereof dynamically at run-time. Based on the usage pattern of the data rows and on how frequently the data rows get accessed, a database server or a component thereof may be configured to classify data rows as hot or as cold on a continuous or periodic basis (e.g., such as continuously in the background or every minute, hour, day, etc). Thus, the classification assigned to a data row by the database server may change with time.

For example, suppose that a set of data rows reflects an order placed by a user in an on-line order system. While the order is being processed, the data rows (as stored in one or more relational tables managed by a database server) that represent the order are likely to be hot as they would be frequently accessed and modified by the front-end client or application that handles the processing of the order. Eventually, when the order gets shipped, the data rows reflecting the order will turn cold. While thereafter the data rows may occasionally be accessed for some reports, eventually the order will be of no interest to any applications or users and therefore the data rows representing the order will become cold and can be compressed and archived on cheap persistent storage. Thus, when the order is still active, the database server may classify the data rows that represent the order as hot and may keep these data rows in data blocks that are stored in faster storage (preferably in the memory buffer cache) in order to improve the access performance to these data rows. However, in a few hours or days when the interest and the need for the order data subsides, the database server may classify the data rows representing the order as cold and may store them in cold data blocks can be further compressed and/or archived on cheaper storage.

It is noted that in some operational contexts, hot data rows may become cold and cold data rows may become hot without the users that manage the data (e.g. such as database administrators) becoming aware. For example, if an audit is going on in a company, records from 3-5 years ago may be accessed by an audit team without notifying the database administrator. Further, in this case the previously cold records from 3-5 years ago may become hot and may need to be kept around for a few weeks until the audit team finishes its work. According to the techniques described herein, in these operational contexts the data rows that store data for the records from 3-5 years ago will be automatically re-classified as hot and will be moved to hot data blocks, which would ensure that the access to these data rows results in a more efficient memory utilization by the database server. This is because the database server automatically makes the which, where, how, and when decisions for each data row based on access-tracking data that reflects how recently each data row was accessed. In contrast, a database server using conventional data management mechanisms does not allow users to specify storage options at the granularity of a data row or even at the granularity of a data block—thus, a database administrator would have no information or the correct criteria in order to configure a more efficient memory utilization by the database server when previously-cold data rows are being accessed.

Automatic Decisions about which Data Rows to Move

According to the techniques described herein, the automatic decisions about which data rows are classified as hot or as cold are performed by the database server based on access-tracking data that are associated with the individual data rows. For example, the database server or the component thereof may access one or more time values in the access-tracking data for a given data row, may compare the one or more time values to one or more thresholds, based on the comparison may determine whether the data row has been recently accessed, and if the data row has been recently accessed the database server can decide that the data row needs to be stored in a hot data block that is designated for storing recently accessed data rows.

In a similar manner, the database server can use the same or different thresholds to decide that a given data row needs to be stored in a cold data block that is designated for storing data rows that have not been recently accessed. The thresholds that the database server uses to decide whether a data row is hot or cold may be specified in one or more policies or rules that are configured for the database server, or may be specified as one or more static or dynamically-configurable database server parameters. In various embodiments and implementations, the values configured for such thresholds may depend on the particular operational context or operational scenario and may be expressed as absolute or relative datetime values (e.g., in the previous 1 minutes, in the previous 3 minutes, since 12:00 am, etc).

Automatic Decisions about where to Move Hot and Cold Data Rows

According to the techniques described herein, a database server automatically decides where to move data rows that have been classified as hot or as cold. For example, in order to store a data row that is classified as hot, the database server or a component thereof may automatically select a hot data block from a plurality of available hot data blocks. Similarly, in order to store a data row that is classified as cold, the database server or a component thereof may automatically select a cold data block from a plurality of available cold data blocks. The database server may keep metadata information which indicates which data blocks are designated as hot and which data blocks are designated as cold, where in various embodiments the database server may store and maintain such metadata information within the data blocks themselves (e.g., as a flag or other value within the header of each data block) or in a centralized repository (e.g., such as a data dictionary).

In some embodiments, according to the techniques described herein, a database server may be configured to automatically store new data rows in hot data blocks. For example, in response to receiving new data that needs to be stored in a database object (e.g., such as a table), the database server or the component thereof may select one or more hot data blocks and may store the new data as one or more new data rows in the selected hot data block(s).

In some embodiments, the data blocks designated for storing hot data rows may be organized in one or more hot regions, and the data blocks designated for storing cold data rows may be organized in one or more cold regions. In these embodiments, the data blocks in a hot region may be further organized in a hierarchy in which different subsets of the data blocks are designated for storing data rows that are accessed according to different access patterns. Similarly, the data blocks in a cold region may also be organized in a hierarchy in which different subsets of the data blocks are designated for storing data rows that are accessed according to different access patterns. Such hierarchical organization increases the chances that data rows that are accessed according to similar patterns are stored in the same data blocks, which in turn ensures a more efficient utilization of the memory buffer cache into which these data blocks are copied when the database server needs access to the data stored therein.

For example, in some embodiments, a new data row will be placed in a data block in the hot region, and if one or more data values in an existing cold data row are updated, that cold data row will be re-classified as hot and will also be moved to a data block in the hot region. Within the hot region, any new data rows will be localized and placed in a subset of blocks in the hot region that store very hot data rows, while data blocks that were previously classified as very hot will eventually become less and less hot. This would allow for data blocks in the hot region to gradually get colder and to eventually be moved to the cold region. Thus, in these embodiments the block hierarchy may be used to designate: data blocks for storing really hot data rows; data blocks that store data rows that were really hot awhile ago but are not so hot any longer; and data blocks that store data rows that used to be hot but can now be classified as cold, which means that these data blocks can be re-classified as belonging to the cold region.

In these embodiments, a hierarchy can be similarly used for data blocks that are classified in the cold region. For example, such hierarchy may be used to designate data blocks that store cold data rows to which access is not likely but may happen, and data blocks that store really cold data rows to which access is not expected to happen at all. Thus, based on this hierarchy, the data blocks that store cold data rows may be compressed by using a compression mechanism that balances compression and decompression performance, while the data blocks that store really cold data rows may be compressed by using a different compression mechanism that can achieve maximum compression.

Automatic Decisions about how to Move Hot and Cold Data Rows

According to the techniques described herein, a database server automatically decides how to move data rows that have been classified as hot or as cold. For example, in some embodiments the database server or a component thereof may automatically decide to what type of persistent storage device to move a given data row, whether the data block(s) in which the data row will be stored should be compressed, and if compression is applicable then at what compression level to compress these data block(s) In these embodiments, the database server or a component thereof can automatically make such decisions based on various system-wide, block-level, and or row-level parameters that may be configured for the database server in one or more policies.

In some embodiments, a database server can automatically decide how to move data rows that have been classified as hot or as cold based on parameters that are configured by users and/or based on parameters that are provided by clients or applications that access the database(s) managed by the database server. For example, a database client or a database application may provide the database server with parameter values that reflect the state of the data rows as seen by the client or the application, and the database server may automatically decide how to move certain data rows based on these parameter values. This functionality may be useful in operational contexts in which the database server may not always be able to determine all characteristics of the data rows because some these characteristics may be dictated by the specific data access logic that is used by the client or the application. For example, some clients or applications may need certain data rows from certain tables to be always present, or "pinned", in the memory buffer cache even though these data rows may not be frequently used or accessed. In another example, a database application may be able to determine that it is done accessing certain data rows from certain tables for the foreseeable future and may want these data rows immediately archived.

Automatic Decisions about when to Move Hot and Cold Data Rows

According to the techniques described herein, a database server automatically decides when to move data rows that have been classified as hot or as cold. In some embodiments, the database server or a component thereof may automatically decide when to move certain data rows based on the estimated impact such move would have on the normal operation of the database server. For example, in estimating the expected impact, the database server or a component thereof may consider possible performance degradation as perceived by users of the database server, which may be important in operational contexts in which the database server is configured to perform mainly OLAP processing that involves computationally-intensive data processing operations. In another example, in estimating the expected impact of moving data rows to different data blocks, the database server or a component thereof may consider the likelihood of increased locking or deadlocks among different user connections, which may be important in operational contexts in which the database server is configured to perform mainly OLTP processing that involves a large number of database transactions.

In different embodiments and operational contexts, a database server can use various different techniques in deciding when to re-allocate data rows to different data blocks. For example, in some embodiments the database server may consider the overall system load based on current parameters such as memory utilization, CPU utilization, network utilization, number of pending transactions, number of database connections, etc. In addition, or instead of, in some embodiments the database server may consider whether to re-allocate the selected data rows individually row-by-row or in batches of different sizes in order to reduce the overhead associated with processing individual rows.

Further Compression of Cold Data Blocks

In embodiments in which a database server provides on-the-fly compression, the database server may use various compression mechanisms to further compress cold data blocks that are designated for, and store, data rows that have not been recently accessed. For example, based on parameters for a particular data row or for a set of data rows (e.g., such as the data rows in a given table), a database server may automatically decide to compress the cold data blocks by selecting a compression mechanism from a plurality of compression mechanisms that have different costs and performance metrics—e.g., such as compression mechanisms that can span the range from low-compression/high-performance mechanisms (which are suitable for compressing data that may be needed in on-line querying) to high-compression/low-performance mechanisms (which are suitable for archiving data that is not likely to be accessed).

By separating and storing cold data rows in designated cold data blocks, the techniques described herein allow for a more efficient use of storage space (since the likelihood of cold data blocks storing only cold data rows would be increased) as well as potentially significant performance gains (since the need for de-compressing cold data blocks would be decreased).

Example Implementations of Automatic Data Placement Operations

In various embodiments, the operations involved in the automatic data placement described herein may be implemented in various ways. For example, in some embodiments, a separate thread may be instantiated by a database server to perform the move operation (and the related automatic decisions) that re-allocates each separate data row. In other embodiments, a database server or a component thereof may instantiate one process or thread that traverses all data rows and marks these data rows as hot or cold, and a different process or thread that traverses the marked data rows, decides when, where, and how to move the marked data rows, and actually moves the marked data rows to hot or cold data blocks accordingly. In various embodiments, the executable code from which such processes and/or threads is instantiated may be included as part of the executable code of the database server or a component thereof (e.g., such as a storage engine) or may be provided as an external add-on module that can be configured for and invoked by the database server.

Structural Description of an Example Embodiment

Figure 2:
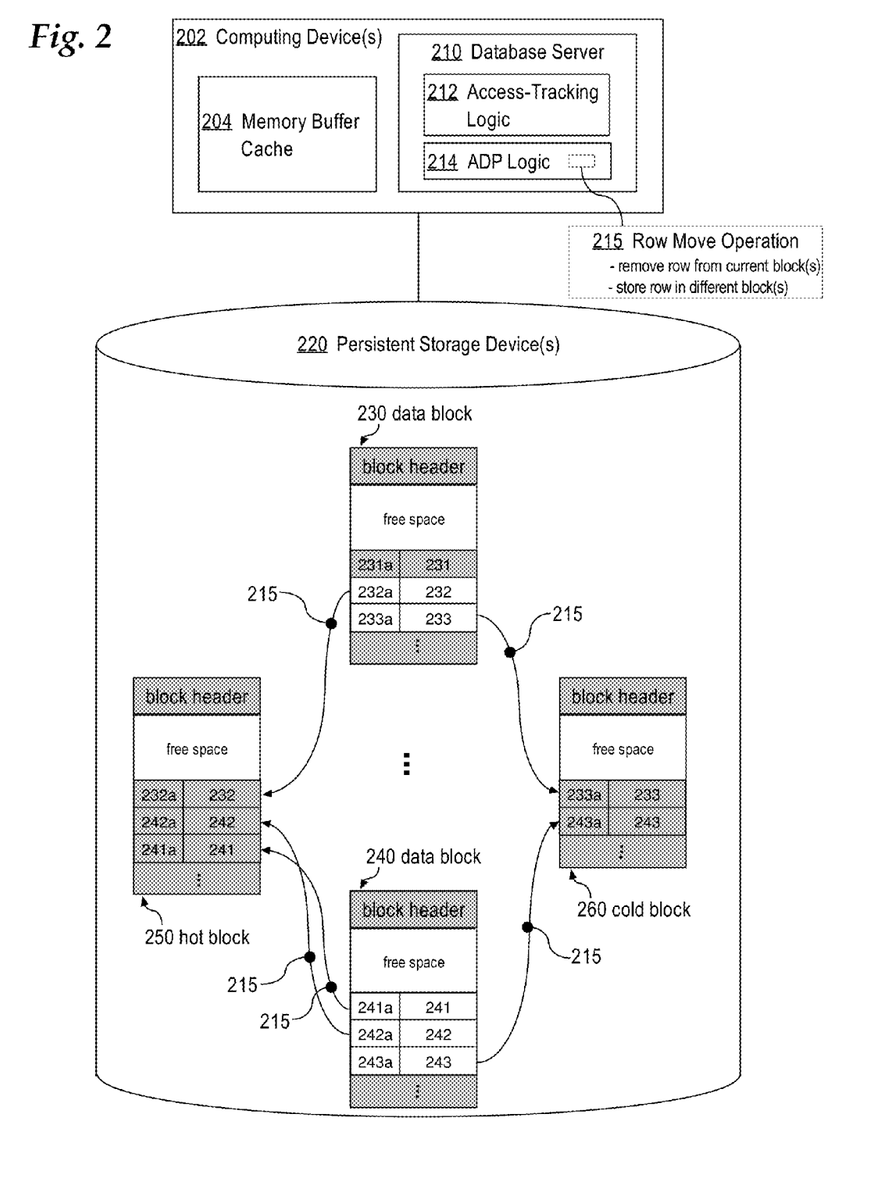
FIG. 2 is a block diagram that illustrates an example operational context according to one embodiment.

FIG. 2 is a block diagram that illustrates an operational context according to an example embodiment. One or more computing devices 202 are configured to execute database server 210. Database server 210 is configured to manage a relational database (not shown in FIG. 2) and to instantiate memory buffer cache 204 that is used for storing, in volatile memory, data blocks that include data rows from the database.

Computing device(s) 202 are communicatively or operatively connected to one or more persistent storage devices 220. Persistent storage device(s) 220 are configured for storing data blocks in one or more data files that are managed by the Operating System (OS) of computing device(s) 202. The data blocks, such as data blocks 230, 240, 250, and 260, are configured for storing data rows that belong to one or more tables of the database that is managed by database server 210.

In operation, database server 210 is configured to receive queries and requests from database clients and database applications, and to process these queries and requests against the database data that is stored in the data block copies that are stored in buffer cache 204. For example, in response to a query, database server 210 determines the data block(s) in which the data rows having the requested data are physically stored, copies each of these data blocks(s) as an entire block from persistent storage device(s) 220 into buffer cache 204 (if these data block(s) are not already stored in the buffer cache), and performs the operations specified in the query on the data rows in the copies of the data block(s) that are stored in buffer cache 204. Database server 210 or a component thereof may use various memory management mechanisms to flush any "dirty" data blocks from buffer cache 204 to persistent storage device(s) 220 in order to free up space for other data blocks that need to be read into the buffer cache. (It is noted that database server 210 may be configured to perform additional data management functions and/or database management functions; however, in order not to obscure the techniques described herein, such additional functions are not discussed or illustrated in FIG. 2.)

According to the techniques described herein, database server 210 comprises access-tracking logic 212 and automatic data placement (ADP) logic 214. As used herein, "logic" refers to a set of executable instructions which, when executed by one or more processors, are operable to perform one or more functionalities. In various embodiments and implementations, any such logic may be implemented as one or more software components that are executable by one or more processors, as one or more hardware components such as Application-Specific Integrated Circuits (ASICs) or other programmable Integrated Circuits (ICs), or as any combination of software and hardware components. In the example embodiment illustrated in FIG. 2, access-tracking logic 212 and ADP logic 214 are implemented as one or more software modules that are part of database server 210.

Access-tracking logic 212 is configured to store and continuously update the access-tracking data that is associated with each individual data row that is stored in data block(s) on persistent storage device(s) 220.

In the embodiment illustrated in FIG. 2, access-tracking logic 212 is configured to update a pseudo-column in a given data row with a system value that can be used by ADP logic 214 to derive the most recent time that the data row was accessed. In this embodiment, the pseudo-column in a data row may act as a row header field that is designated for storing one or more system values that may be maintained specifically for effectuating the techniques for automatic data placement described herein or may be maintained for other reasons. For example, when data row 231 in data block 230 is updated (in the block copy in buffer cache 204), access-tracking logic 212 is configured to automatically store a system value in pseudo-column 231a, where the system value can be used to derive the identifier of the transaction that updated data row 231, thereby allowing ADP logic 214 to determine the time at which data row 231 was updated. In a similar manner, access-tracking logic 212 may continuously maintain access-tracking data for each data row that is stored in data blocks on persistent storage device(s) 220.

In addition, access-tracking logic 212 may use various mechanisms to keep track of access-tracking data that indicates the time a read operation is performed against a data row; for example, access-tracking logic 212 may store a timestamp or other indicator each time a value is read from a data row in buffer cache 204, where such timestamp or other indicator may be stored with the data row or in a centralized repository and may directly or indirectly indicate the time the read operation was performed against the data row.

ADP logic 214 is configured to perform the automatic data placement operations in accordance with the techniques described herein while database server 210 is executing in normal operation mode. In order to minimize any adverse impact on database server 210, ADP logic 214 is configured to make decisions in the background about which data rows to select for moving, to which data blocks the selected data rows should be moved, how the data rows should be moved, and when the data rows should be moved. Based on the access-tracking data associated with any given data row, ADP logic 214 is configured to classify that data row as hot or as cold on a continuous or periodic basis, and to perform move operation 215 for that data row in accordance with the decisions regarding where, how, and when the data row should be moved.

Move operation 215 involves removing a data row from the data block(s) in which the data row is currently stored and storing the data row in different data block(s), where these two actions can be performed in any order as long as move operation 215 is performed in an atomic manner that ensures against data inconsistencies and loss of data. For example, one or more move operations 215 may be performed as a server-initiated background transaction (along with maintaining any necessary logs, such as redo logs) that is different and separate from any transactions and operations that database server 210 may be performing in normal operation mode in response to queries and requests from users, clients, and applications that access the data managed by the database server. Depending on the particular operational context, ADP logic 214 may be configured to perform move operation 215 separately for each data row, or to perform the move operations for multiple data rows in batches of various sizes in order to minimize the processing overhead and/or the impact on the operation of database server 210.

In the operational example illustrated in FIG. 2, data block 230 stores data rows 231-233 and data block 240 stores data rows 241-243, where the white regions in the data blocks indicate free space and the shaded regions indicate block space that stores data. (It is noted that for illustration purposes only, the data rows in the data blocks illustrated in FIG. 2 are shown one on top of the other. In practical implementations, however, this is not the case because a data block is typically implemented as a continuous data structure that sequentially stores data rows having different lengths, where the offsets into the data block for each data row are maintained in the block header.)

In the operational example of FIG. 2, ADP logic 214 designates data block 250 as a hot data block for storing data rows that have been recently accessed, and designates data block 260 as a cold data block for storing data rows that have not been recently accessed. ADP logic 214 can designate each data block by storing a flag or some other data value(s) in the header of that data block, where the flag or the other data value(s) indicate the type (e.g., hot or cold) of that data block. In accordance with the techniques described herein, ADP logic 214 traverses some or all data rows in the various data blocks on persistent storage device(s) 220 (e.g., such as data blocks 230 and 240), classifies each data row as hot or as cold based on the access-tracking data stored in that data row, and performs move operation 215 for each data row to move the data row to hot or cold data block(s). During the performance of move operation 215, ADP logic 214 keeps track of all metadata information that is relevant to the data row being moved (including, but not limited to, any metadata information associated with the data block from which the data row is moved and any buffer cache copies thereof, and any metadata information associated with the data block to which the data row is moved and any buffer cache copies thereof), so that regular database server operations and transactions are not affected.

For example, ADP logic 214 retrieves the access-tracking data stored in field 232a of data row 232 in data block 230. Based on the access-tracking data, ADP logic 214 determines that data row 232 has been recently accessed and classifies this data row as hot. ADP logic 214 then decides that data row 232 should be moved to hot data block 250. Thereafter, ADP logic 214 invokes move operation 215, which stores data row 232 in hot data block 250 and removes data row 232 from data block 230. Similarly, based on the access-tracking data stored in field 233a of data row 233, ADP logic 214 determines that data row 233 has not been recently accessed and classifies this data row as cold. ADP logic 214 then decides that data row 233 should be moved to cold data block 260. Thereafter, ADP logic 214 invokes move operation 215, which stores data row 233 in cold data block 260 and removes data row 233 from data block 230. (After data rows 232 and 233 are moved to data blocks 250 and 260, respectively, ADP logic 214 or another component of database server 210 may move data row 231 within block 230 in order to consolidate the free space within the block into a continuous chunk.)

ADP logic 214 processes the data rows in data block 240 in a similar manner. For example, ADP logic 214 retrieves the access-tracking data stored in field 241a of data row 241. Based on the access-tracking data, ADP logic 214 determines that data row 241 has been recently accessed and classifies this data row as hot. ADP logic 214 then decides that data row 241 should be moved to hot data block 250. Thereafter, ADP logic 214 invokes move operation 215, which stores data row 241 in hot data block 250 and removes data row 241 from data block 240. Similarly, based on the access-tracking data stored in field 242a of data row 242, ADP logic 214 determines that data row 242 has been recently accessed and classifies this data row as hot. ADP logic 214 then decides that data row 242 should be moved to hot data block 250. Thereafter, ADP logic 214 invokes operation 215, which stores data row 242 in hot data block 250 and removes data row 242 from data block 240. Based on the access-tracking data stored in field 243a of data row 243, ADP logic 214 determines that data row 243 has not been recently accessed and classifies this data row as cold. ADP logic 214 then decides that data row 243 should be moved to cold data block 260. Thereafter, ADP logic 214 invokes move operation 215, which stores data row 243 in cold data block 260 and removes data row 243 from data block 240. After one or more of data rows 241-243 are moved out of data block 240, ADP logic 214 or another component of database server 210 may consolidate the free space within the block into a continuous chunk.

In some operational scenarios, ADP logic 214 may be further configured to compress cold data blocks. For example, ADP logic 214 may be configured to select a compression mechanism for a given cold data block based on the access patterns to the data rows stored in this data block, and may use this compression mechanism to compress this data block and to keep it in compressed form on persistent storage device(s) 220; when ADP logic 214 needs to move a data row to this data block, the ADP logic 214 un-compresses the data block, stores the data row therein, and then re-compresses the data block prior to storing it back on the persistent storage device(s). In another example, ADP logic 214 may be configured to select a compression mechanism for a given cold data block based on the access patterns to the data rows stored in this data block, and may use this compression mechanism to compress this data block after this data block is full or stores at least a threshold amount of data. Depending to the particular storage and performance needs, in various operational scenarios ADP logic 214 or another component of database server 210 may use various other approaches to compress cold data blocks by using various other compression mechanisms that may span the range of low-compression/high-performance mechanisms to high-compression/low-performance mechanisms.

Example Embodiments for Storage Devices with Different Characteristics

Figure 3:
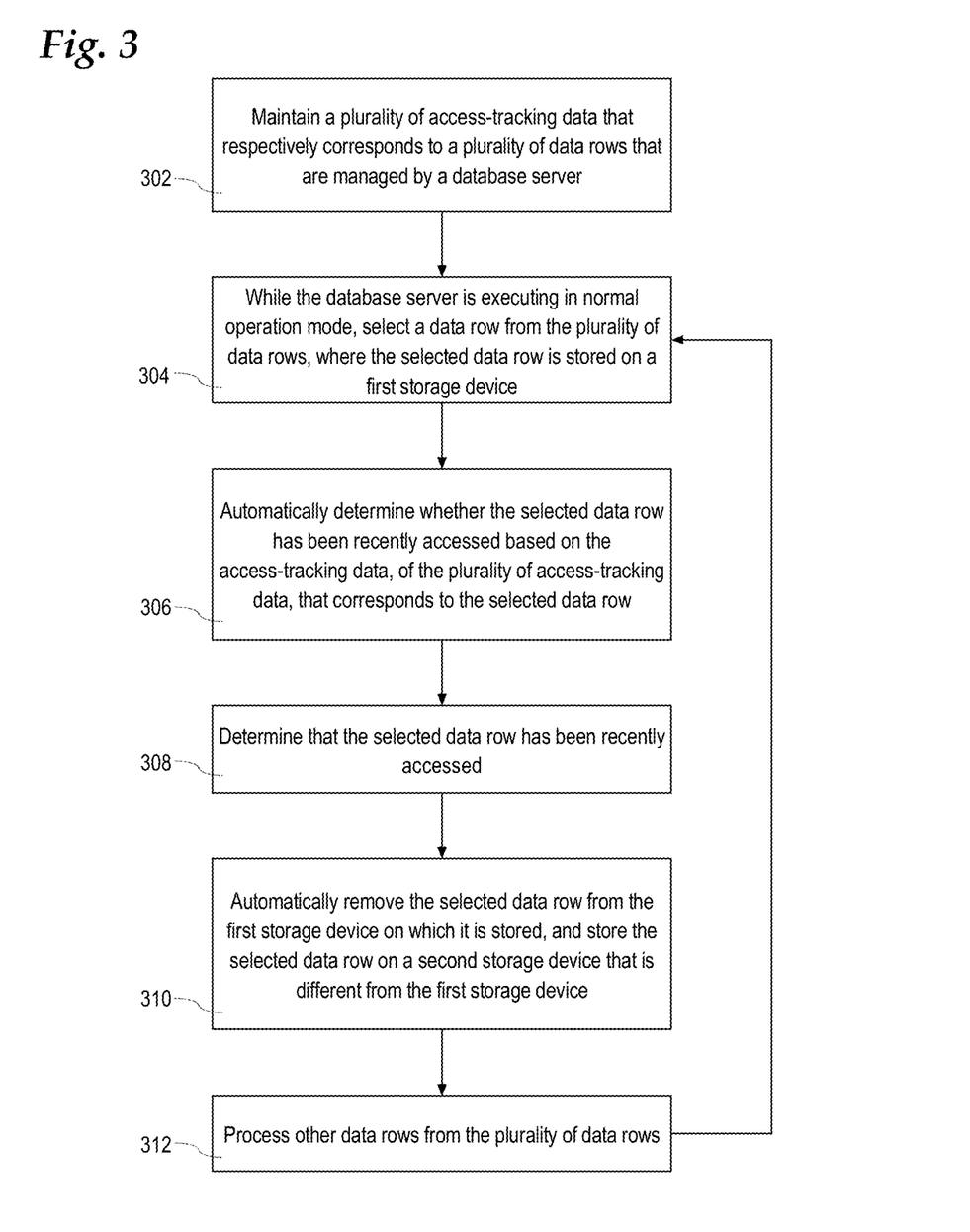
FIG. 3 is a flow diagram that illustrates another example method for automatic data placement according to one embodiment.

FIG. 3 is a flow diagram that illustrates an example method for automatic data placement in accordance with the techniques described herein. In some embodiments, the steps of the method illustrated in FIG. 3 may be performed by a database server that is executing on one or more computing devices, while in other embodiments the steps of the method may be performed by computer process entities other than a database server including, but not limited to, background processes or threads, daemon processes, and any other types of system services or servers that can run automatically and not under direct user control.

The method illustrated in FIG. 3 is described hereinafter as being performed by a database server or one or more associated components thereof. However, it is noted that this description is for illustrative purposes only because the method of FIG. 3 is not limited to being performed by any particular type of computer process entity or service.

In step 302, a database server and/or a component thereof stores and continuously maintains a plurality of access-tracking data that respectively corresponds to a plurality of data rows that are managed by the database server. The access-tracking data for each particular data row is a set of one or more values that indicate the most recent time(s) when that particular data row was accessed.

While the database server is executing in normal operation mode, in step 304 the database server or a component thereof automatically selects, for processing in accordance with the techniques described herein, a particular data row that is stored on a first storage device. In various implementations, the particular data row may be stored in various formats. In one example, the particular data row may be stored in row-major format in one or more data blocks that are physically allocated as portions of one or more data files that are stored on the first storage device. A row-major format is a format in which data values from different columns of the same data row are stored as a sequence one after the other. In another example, the one or more data values of the particular data row may be stored in one or more corresponding columnar datasets that are formatted in a column-major format. In a column-major format, data values from the same single column in multiple different data rows (e.g., such as a set of data rows from the same table) are stored as a sequence one after the other.

After selecting a data row for automatic data placement, in step 306 the database server or a component thereof automatically determines whether the selected data row is a hot data row that has been recently accessed based on the access-tracking data that corresponds to that data row. For example, the database server or the component thereof may access one or more time values in the access-tracking data for the selected data row, may compare the one or more time values to some static or dynamically-configurable threshold parameter(s), and based on the comparison may determine whether the selected data row has been recently accessed. In step 308, the database server or the component thereof determines that the selected data row has been recently accessed.

In step 310, the database server or the component thereof automatically removes the selected data row from the first storage device in which the selected data row is currently stored, and automatically stores the selected data row in a second storage device that is different than the first storage device. According to the techniques described herein, the second storage device may be a high-performance storage device that is designated for storing hot data.

In implementations in which the selected data row is stored in row-major format in one or more data blocks, in step 310 the database server or a component thereof may perform a move operation that moves the selected data row from data block(s) stored on the first storage device to data block(s) stored on the second, high-performance storage device.

In implementations in which the data value(s) in the selected data row are stored in column-major format in columnar dataset(s), in step 310 the database server or a component thereof may first retrieve the selected data row from the columnar dataset(s) stored on the first storage device, and may then store the selected data row in columnar dataset(s) that are stored on the second, high-performance storage device. In these implementations, the operations to retrieve a data row from columnar dataset(s) and to store a data row in columnar dataset(s) typically involve retrieving the columnar dataset(s) from the storage device, un-packing the columnar dataset(s) to assemble the data values stored therein into the entire data rows, and then re-packing the columnar dataset(s) after data values of one or more data row are removed from or stored therein. Because of this, in embodiments in which data rows are stored in column-major format, the techniques described herein provide for moving data rows from one storage device to another storage device in bulk or in batches, where the data rows being moved typically belong to the same database object (e.g., such as a table) which ensures that they store data values that correspond to the same columns.

In step 312, the database server or a component thereof proceeds to select and process other data rows by performing steps 304 to 310, while concurrently and continuously maintaining the access-tracking data for the plurality of data rows as indicated in step 302.

According to the techniques described herein, the move operation, which moves a data row (or a batch of data rows) from a current storage device to a new location in a different storage device, is implemented in a manner that does not adversely impact the normal operation of the database server and any on-going operations and transactions that may be executing therein.

In some embodiments, in step 306 the database server or a component thereof may be further configured to automatically determine whether a selected data row has not been recently accessed. For example, based on one or more time values in the access-tracking data for the selected data row, the database server or the component thereof may determine that the selected data row is a cold data row that has not been recently accessed. Thereafter, the database server or the component thereof automatically removes the selected cold data row from the storage device in which the selected cold data row is currently stored, and automatically stores the selected cold data row in a high-capacity storage device that is designated for storing cold data rows that have not been recently accessed. It is noted that the selected cold data row may be stored in row-major or column-major formats, and that the operations involved in moving a cold data row to a different storage device are similar to the operations described above for moving hot data rows in row-major and column-major formats.

In this manner, the techniques described herein allow the database server to store recently accessed rows in high-performance storage devices and to store data rows that have not been recently accessed in high-capacity storage devices, thereby making a more efficient (in terms of both capacity and performance) usage of the storage devices based on their cost, capacity, and/or performance characteristics. Thus, the techniques described herein leverage the tradeoffs between storage performance and storage capacity at the more granular level of a data row.

In some embodiments, the example method illustrated in FIG. 3 may be performed in a storage system that is configured to store the data of one or more databases that are managed by a database server.

For example, in these embodiments, one or more storage systems may be configured to provide data storage to a database server, where the database server and the storage systems are connected over a network. One example of such network is an Infiniband network that comprises switches with interfaces that provide for bi-directional communication links between database servers and storage systems.

In these embodiments, a storage system may be a self-contained computing device whose hardware is physically distinct from the hardware of the one or more computing devices on which the database server is configured to execute. The storage system comprises a storage server that is operatively and/or communicatively connected to one or more persistent storage devices (e.g., such as optical or electromagnetic disks), where the storage server includes logic for storing, retrieving, managing, and providing access to the data stored on the persistent storage device(s). The storage system also includes logic that is configured to perform automatic data placement operations in accordance with the techniques described herein, where such logic may be included as part of the storage server or may be provided as separate module(s) that can be executed in the storage system.

In operation, the database server may be configured to send data to the storage system for storing in the form of data blocks or some other discrete datasets, and the storage server in the storage system is configured to store the data in various storage units on the persistent storage device(s). Along with the datasets sent to the storage system for storing, the database server may also send access-tracking data that corresponds to each data row that is represented in these datasets, where the access-tracking data is used by the logic in the storage system to facilitate automatic data placement of the corresponding data rows in accordance with the techniques described herein by performing, for example, the steps of the method illustrated in FIG. 3.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, network infrastructure devices, or any other device that incorporates hard-wired and/or program logic to implement the techniques.

Figure 4:
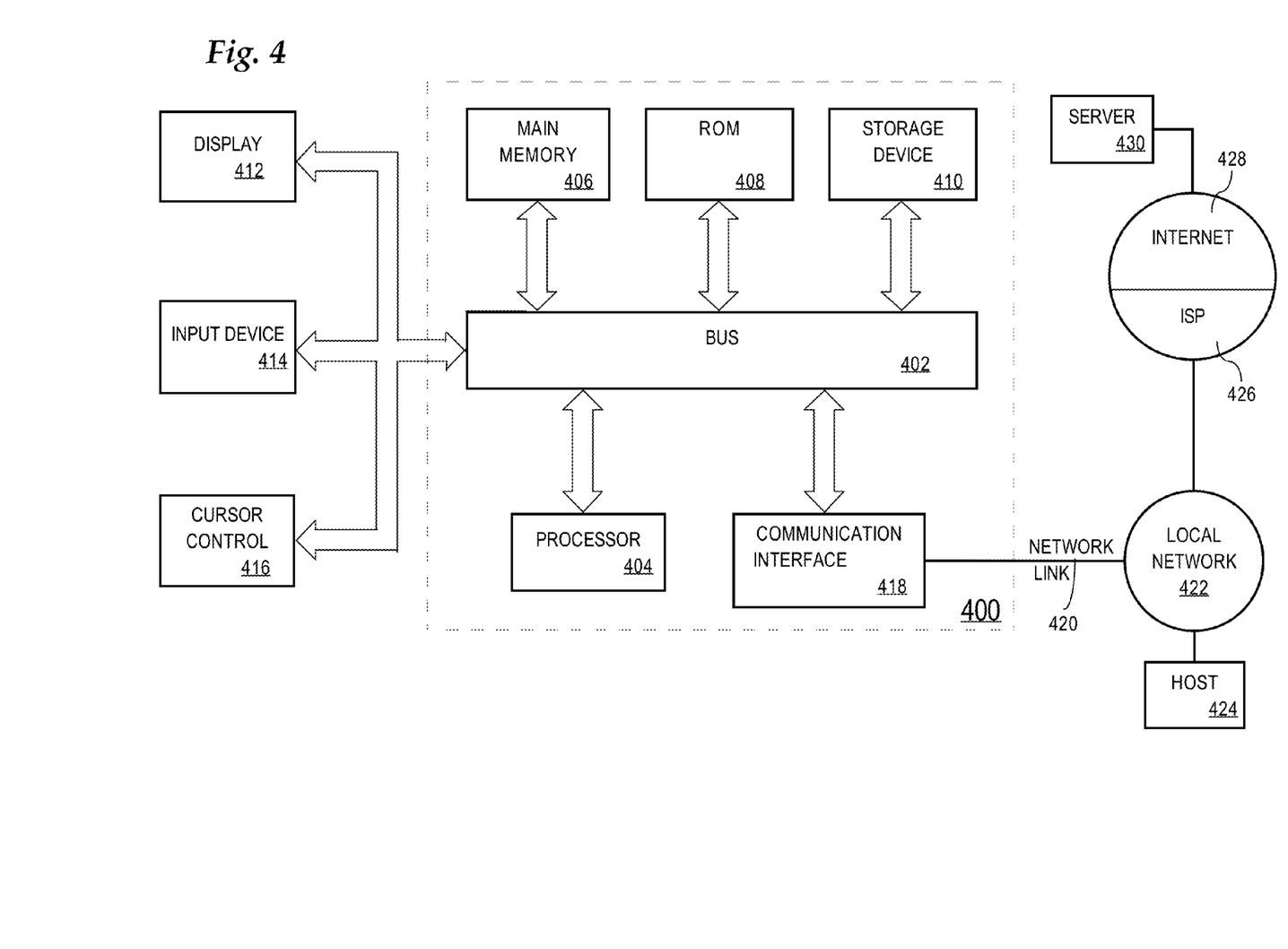
FIG. 4 is a block diagram that illustrates an example computing device on which embodiments may be implemented.

For example, FIG. 4 is a block diagram that illustrates a computer system 400 upon which an embodiment of the techniques described herein may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT) or a liquid crystal display (LCD), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques for automatic data placement described herein by using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A computer-implemented method comprising:
   maintaining a plurality of access-tracking data about accesses to a plurality of data rows in a database that is managed by a database server, said plurality of access-tracking data including first access-tracking data about accesses to a first data row of said plurality of data rows, said database comprising multiple data blocks that store said plurality of data rows, said multiple data blocks comprising a plurality of hot data blocks and a plurality of cold data blocks, where the plurality of hot data blocks are designated for storage of a type of storage that is faster than a type of storage designated for said plurality of cold data blocks;

while the database server is executing database transactions that change said database, performing steps comprising:

based on said first access-tracking data, determining to move said first data row from a cold data block of said plurality of cold data blocks to a hot data block of said plurality of hot data blocks;

in response to determining to move said first data row from a cold data block of said cold data blocks to a hot data block of said hot data blocks, removing said first data row from first one or more cold data blocks of said plurality of cold data blocks and storing the first data row into first one or more hot data blocks of said plurality of hot data blocks; and wherein the method is performed by one or more computing devices.

2. The method of claim 1, further performing the steps of:

while the database server is executing database transactions that change said database, performing steps comprising:

based on second access-tracking data of said plurality of access-tracking data, determining to move a second data row of said plurality of data rows from a hot data block of said plurality of hot data blocks to a cold data block of said plurality of cold data blocks;

in response to determining to move a second data row of said plurality of data rows from a hot data block of said plurality of hot data blocks to a cold data block of said plurality of cold data blocks, removing the second data row from second one or more hot data blocks of said plurality of hot data blocks and storing the second data row into second one or more cold data blocks of said plurality of cold data blocks.

3. The method of claim 2, further comprising compressing the second one or more cold data blocks by using one or more compression mechanisms.

4. The method of claim 1, further comprising:

determining that a new data row is received by the database server; and in response to determining that a new data row is received by the database server, causing the new data row to be stored in one or more of the hot data blocks.

5. The method of claim 1, wherein:

particular one or more hot data blocks are persistently stored on one or more storage devices; and the method further comprises copying each of the particular one or more hot data blocks into a memory cache managed by the database server.

6. The method of claim 1, wherein the plurality of data rows belong to one or more tables in one or more databases that are managed by the database server.

7. The method of claim 1, wherein for each particular data row, of the plurality of data rows, the plurality of access-tracking data includes a corresponding access-tracking data that comprises one or more of:

a first time value indicating a last time when the particular data row was read;

a second time value indicating the last time when the particular data row was modified;

a third time value indicating the last time when a table that stores the particular data row was read;

a fourth time value indicating the last time when the table that stores the particular data row was modified.

8. The method of claim 1, wherein maintaining the plurality of access-tracking data comprises:

continuously updating and storing particular access-tracking data corresponding to a particular data row, of the plurality of data rows, in one or more of:

the particular data row; and a block header of a particular data block in which the particular data row or a portion thereof is stored.

9. The method of claim 1, wherein the plurality of hot data blocks are organized in a hierarchy based on access times.

10. The method of claim 1, wherein automatically removing the first data row from the first one or more cold data blocks and storing the first data row in the first one or more hot data blocks is performed in accordance with one or more policies that are configured at the database server.

11. A non-transitory computer-readable storage medium storing one or more sequences of instructions which, when executed by one or more processors, cause:

maintaining a plurality of access-tracking data about accesses to a plurality of data rows in a database that is managed by a database server, said plurality of access-tracking data including first access-tracking data about accesses to a first data row of said plurality of data rows, said database comprising multiple data blocks that store said plurality of data rows, said multiple data blocks comprising a plurality of hot data blocks and a plurality of cold data blocks, where the plurality of hot data blocks are designated for storage of a type of storage that is faster than a type of storage designated for said plurality of cold data blocks;

while the database server is executing database transactions that change said database, performing steps comprising:

based on said first access-tracking data, determining to move said first data row from a cold data block of said plurality of cold data blocks to a hot data block of said plurality of hot data blocks; and in response to determining to move said first data row from a cold data block of said cold data blocks to a hot data block of said hot data blocks, removing said first data row from first one or more cold data blocks of said plurality of cold data blocks and storing the first data row into first one or more hot data blocks of said plurality of hot data blocks.

12. The non-transitory computer-readable storage medium of claim 11, the one or more sequences of instructions further comprising instructions that cause:

while the database server is executing database transactions that change said database, performing steps comprising:

based on second access-tracking data of said plurality of access-tracking data, determining to move a second data row of said plurality of data rows from a hot data block of said plurality of hot data blocks to a cold data block of said plurality of cold data blocks;

in response to determining to move a second data row of said plurality of data rows from a hot data block of said plurality of hot data blocks to a cold data block of said plurality of cold data blocks, removing the second data row from second one or more hot data blocks of said plurality of hot data blocks and storing the second data row into second one or more cold data blocks of said plurality of cold data blocks.

13. The non-transitory computer-readable storage medium of claim 12, the one or more sequences of instructions further comprising instructions that cause compressing the second one or more cold data blocks by using one or more compression mechanisms.

14. The non-transitory computer-readable storage medium of claim 11, the one or more sequences of instructions further comprising instructions that cause:
   determining that a new data row is received by the database server; and
   in response to determining that a new data row is received by the database server, causing the new data row to be stored in one or more of the hot data blocks.

15. The non-transitory computer-readable storage medium of claim 11, wherein:
   particular one or more hot data blocks are persistently stored on one or more storage devices; and
   the one or more sequences of instructions further comprise instructions that cause copying each of the particular one or more hot data blocks into a memory cache managed by the database server.

16. The non-transitory computer-readable storage medium of claim 11, wherein the plurality of data rows belong to one or more tables in one or more databases that are managed by the database server.

17. The non-transitory computer-readable storage medium of claim 11, wherein for each particular data row, of the plurality of data rows, the plurality of access-tracking data includes a corresponding access-tracking data that comprises one or more of:
   a first time value indicating a last time when the particular data row was read;
   a second time value indicating the last time when the particular data row was modified;
   a third time value indicating the last time when a table that stores the particular data row was read;
   a fourth time value indicating the last time when the table that stores the particular data row was modified.

18. The non-transitory computer-readable storage medium of claim 11, wherein maintaining the plurality of access-tracking data comprises:
   continuously updating and storing particular access-tracking data corresponding to a particular data row, of the plurality of data rows, in one or more of:
      the particular data row; and
      a block header of a particular data block in which the particular data row or a portion thereof is stored.

19. The non-transitory computer-readable storage medium of claim 11, wherein the plurality of hot data blocks are organized in a hierarchy based on access times.

20. The non-transitory computer-readable storage medium of claim 11, wherein automatically removing the first data row from the first one or more cold data blocks and storing the first data row in the first one or more hot data blocks is performed in accordance with one or more policies that are configured at the database server.

* * * * *

UNITED STATES PATENT AND TRADEMARK OFFICE
CERTIFICATE OF CORRECTION

| | | |
|---|---|---|
| PATENT NO. | : 9,165,016 B2 | Page 1 of 1 |
| APPLICATION NO. | : 14/570199 | |
| DATED | : October 20, 2015 | |
| INVENTOR(S) | : Ganesh et al. | |

It is certified that error appears in the above-identified patent and that said Letters Patent is hereby corrected as shown below:

In the specification

Column 12, line 23, delete "awhile" and insert -- a while --, therefor.

Column 12, line 54, delete "and or" and insert -- and/or --, therefor.

Signed and Sealed this
Seventh Day of June, 2016

Michelle K. Lee
*Director of the United States Patent and Trademark Office*